3,224,428
VIEWING DEVICE FOR VACUUM APPARATUS
Walter Dietrich and Friedrich Krall, Hanau am Main, Germany, assignors of one-half each to W. C. Heraeus G.m.b.H., Hanau am Main, Germany, and Deutsche Gold- und Silber-Scheideanstalt vormals, Roessler, Frankfurt am Main, Germany
Filed Oct. 15, 1963, Ser. No. 316,318
Claims priority, application Germany, Nov. 7, 1962, H 47,342
5 Claims. (Cl. 126—200)

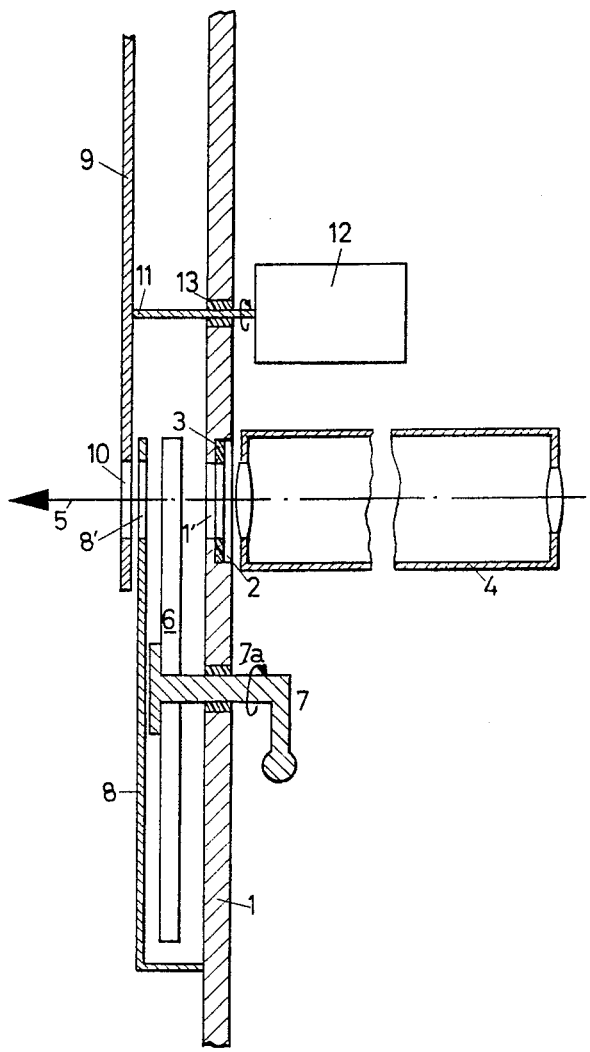

The present invention relates to a viewing device for inspecting the inside of an evacuated chamber of a vacuum apparatus such as a melting, annealing, distilling, vapor-coating, or similar apparatus.

In order to permit a melting, vapor-coating or other process to be observed from the outside while it is being carried out at the inside of the evacuated chamber of a vacuum apparatus, one or more inspection glasses are usually installed in the wall or cover for such a chamber. However, since it is usually unavoidable that vapors, for example, of metals which are produced during the particular process are deposited on the inner wall surfaces of the vacuum chamber, those vapors will also settle on the inner surface of the inspection glass which will thus soon be coated so thickly that any further observation through this glass will become impossible.

Various means have already been proposed and employed in an effort to overcome this disadvantage and to permit a relatively clear view upon the inside of a vacuum chamber during the entire period in which a process is being carried out therein. Thus, for example, a plurality of cover glasses has been mounted in a rotatable holder at the inside of a vacuum chamber which may be turned from the outside so as to permit one cover glass after another to be slid in front of the inner surface of the inspection glass. When one cover glass then becomes clouded by a vapor deposit, it may be quickly exchanged for another clear cover glass. Since in some processes the vapor development is so strong that the individual cover glasses become coated very quickly and therefore have to be frequently exchanged on the inner side of the inspection glass, a rather large and expensive glass holding device with a very large number of cover glasses has to be provided. Even such a device is, however, often inadequate to permit a longer lasting process to be observed from beginning to end.

For certain processes which are carried out in vacuum chambers it is also known to pass a transparent cover strip similarly to a film continuously along the inner side of the inspection glass by drawing it off a supply reel and winding it upon a take-up reel. This method of covering the inspection glass to keep it clean and permit the process to be observed during its entire performance in the vacuum chamber can be applied, however, only if relatively low temperatures prevail in this chamber since the transparent cover strip would be immediately destroyed if it were exposed to the high temperatures prevailing, for example, in a vacuum melting, annealing, or casting furnace.

In another viewing device a sector-shaped diaphragm is normally placed in front of the inner side of the inspection glass so as to cover the same completely while not in use. If a short inspection is to be made through this glass, the diaphragm may be swiveled away from it so as to uncover its inner side. This device has the disadvantage that it only permits a very short observation of the process which is carried out in the vacuum chamber inasmuch as the inner side of the inspection glass would otherwise soon be vapor-coated.

In still another known viewing device for vacuum apparatus a pair of slotted diaphragms are arranged at a fixed distance behind each other in front of the inner side of the inspection glass and are rotated synchronously in order to prevent the inspection glass from being vapor-coated. The two diaphragms are spaced from each other at such a distance that the vapor particles which enter the space between the diaphragms pass through this space and then impinge upon a part of the diaphragm adjacent to the inner side of the inspection glass. This device is very expensive and it also has the disadvantage that the angle of view is very restricted due to the arrangement of the two diaphragms behind each other. Further considerable difficulties and disadvantages of this device are due to the fact that, in order to attain the effect of arresting the vapor molecules which are traveling at a very high velocity, for example, in a vacuum melting or vapor-coating apparatus, it is necessary to rotate the diaphragms at an extremely high speed.

It is an object of the present invention to provide a very simple viewing device for vacuum apparatus which overcomes all of the above-mentioned disadvantages and essentially consists of an inspection window which is mounted hermetically in an aperture in the wall of the vacuum chamber, a transparent disk, for example, of glass which is movably mounted at the inside of the vacuum chamber in front of the inspection window, and a disklike rotor which is provided with a round hole or an aperture of any other suitable shape and is disposed behind the transparent disk, as seen in the viewing direction into the vacuum chamber. This combination of elements insures that the vapor from the vacuum chamber will not be deposited on the inspection window but only on a part of the transparent disk which is located between the inspection window and the rotor. The length of time until a vapor coating is formed on the transparent disk is extended by providing the rotor with a round or, for example, slot-shaped aperture. The vapor particles can then pass through the aperture to the transparent disk only during the moment in which the aperture in the revolving rotor is located in front of the disk. If the rotor is provided with a single aperture near its outer edge, the delay factor, i.e. the length of the delay until the transparent disk is coated, depends upon the ratio of the width of the rotor aperture to the circumference of the circle on the rotor disk which intersects with the viewing axis. This delay factor may be easily made as large as about 300 which in actual practice means that, if an observation of the process in the vacuum chamber could previously be carried out through the inspection window alone only for a period of one minute because of the formation of the vapor coating on this window, such an observation may now be carried out for a period of five hours until a part of the transparent disk will be completely coated so as to prevent any further observation through the inspection window.

In order to extend the observation period still further the invention provides that the transparent disk which intercepts and receives the metal vapors may be moved relative to the inspection window so that always only that area of the transparent disk will be vapor-coated which is located directly in front of the inner side of the inspection window, whereas the remainder of the transparent disk is protected from the vapor by means of a stationary screen. When one such area of the transparent disk is vapor-coated, the disk is moved so as to place another uncoated area in front of the inspection window. The number of areas of the inspection window which may thus be coated successively depends upon the size of the transparent disk and the diameter of the opening in the wall of the vacuum chamber through which the observation is made.

In order to attain the object of the invention to make the mentioned delay factor as large as possible, the viewing device according to the invention is preferably provided with a viewing tube on the outside of the vacuum chamber in front of the inspection window. This viewing tube may, for example, be of the type known as a "keyhole viewer" which permits the use of a very small inspection window of a diameter of about 10 mm. This, in turn, means that a view into the vacuum chamber only requires a small viewing area on the transparent disk. It is then easily possible to provide thirty or more positions to which the transparent disk may be successively adjusted. The mentioned delay factor of the observation period will thus be further enlarged and may easily be made as large as 10.000. This means that the viewing device may be used for several weeks until the transparent disk will be vapor-coated to such an extent that it has to be replaced by a clean disk.

The disk-shaped rotor with the aperture therein is preferably rotated at such a speed that the eye of the observer will receive at least 20 images per second. At such a rate of speed, the individual images will combine to appear as one continuous image.

Another considerable advantage of the viewing device according to the invention is its great simplicity of construction and the fact that it may be employed for any vacuum apparatus in which a clear observation of the proceedings occurring therein might be prevented by a vapor coating forming on the inspection window. The viewing device according to the invention also permits such a clear observation of the proceedings in the vacuum chamber without unduly limiting the angle of view.

The above-mentioned features and advantages of the viewing device according to the invention will become further evident from the following description of a preferred embodiment thereof as illustrated diagrammatically and in cross section in the accompanying drawing.

As shown in this drawn, the wall 1 of the vacuum chamber is provided with an aperture 1' in which by suitable sealing means 3 an inspection window 2 is mounted in a conventional manner to close this aperture hermetically. On the outside of the vacuum chamber a viewing tube 4 is mounted in front of the inspection window 2 in a manner so that the optical axis 5 extends centrally through the inspection window into the vacuum chamber. At the inside of the vacuum chamber a transparent disk 6, for example, of glass, is rotatably mounted eccentrically to the inspection window 2 so as to cover the latter in any position of its adjustment. In the particular embodiment of the invention as diagrammatically illustrated in the drawing, the inspection window 6 is mounted on a device 7 which extends through hermetic sealing means 7a in the wall of the vacuum chamber to the outside where it may be turned, for example, by means of a handle. The other side of disk 6 is shielded completely from the metal vapor at the inside of the vacuum chamber by a stationary screen 8, except for the area on disk 6 which is in axial alignment with the aperture 8' in this screen. Behind screen 8, as seen in the direction of view into the vacuum chamber according to the arrow 5, there is a disklike rotor 9 which is mounted on a shaft 11 which extends through hermetic sealing means 13 in the wall 1 of the vacuum chamber to the outside of the latter where it is driven by a motor 12. Rotor 9 is preferably provided with a single aperture 10 which in one particular position during each revolution of rotor 9 comes into alignment with the aperture 8' in screen 8. The metal vapor in the vacuum chamber can therefore pass through the aperture 8' to the small area on the transparent disk 6 behind this aperture only once during each revolution of rotor 9 when the two apertures 10 and 8' are temporarily in alignment. As previously indicated, rotor 9 is preferably driven at a speed of at least 1200 r.p.m. so that the eye of the observer looking through the viewing tube 4 will receive at least 20 images per second which will then appear like one continuous image.

Instead of mounting the motor 12 at the outside of the vacuum chamber, it is also possible to mount it within this chamber. This has the advantage that the motor shaft 11 on which the rotor 9 is mounted does not have to pass through the wall 1 of the vacuum chamber and that the difficulties of hermetically sealing this shaft relative to the wall 1 will be avoided. In a similar manner it is also possible to mount the means for turning the transparent disk 6 entirely within the vacuum chamber. These means may then consist, for example, of a small electromagnet which is periodically actuated to turn the transparent disk 6 for the required distance to replace a vapor-coated area thereon by a clean area. In both of these cases it is then only necessary to pass the lead-in wires for the motor and the electromagnet through small bores in the wall 1 of the vacuum chamber and to seal them in these bores hermetically.

In place of the dislike rotor 6 it is also possible to provide other equivalent means, for example, an oscillator which consists of a reciprocating disklike segment with an aperture therein which may, for example, be slot-shaped. The means for driving such an oscillator may be very simple and of a conventional type.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a vacuum chamber, a wall having an aperture therein, an inspection window hermetically sealed in said aperture in the wall of said chamber, a rotatable transparent disk mounted within said chamber so that one side thereof faces the inner side of said window, means for moving said disk in a direction substantially parallel to said window, means for covering the other side of said disk at least at the area thereof disposed in front of said window, said covering means having an aperture therein, and means for moving said covering means so that said aperture therein is intermittently moved in front of said area so as to uncover the same at least twenty times per second.

2. In a vacuum chamber, a wall having an aperture therein an inspection window hermetically sealed in said aperture in the wall of said chamber, a transparent disk mounted within said chamber so that one side thereof is adjacent the inner side of said window, means for rotating said disk in a direction substantially parallel to said window, stationary cover means in the chamber for covering the other side of said disk and having an aperture disposed in alignment with the area of said disk in front of said window, movable cover means for covering said stationary cover means at least at said area thereof, said movable cover means having an aperture, and means for moving said movable cover means so that said aperture therein is intermittently moved in alignment with said aperture in said stationary cover means so as to uncover said area on said disk.

3. A viewing device as defined in claim 1, further comprising a viewing tube mounted on the outside of said vacuum chamber in front of and in axial alignment with said inspection window.

4. In a vacuum chamber, a wall having an aperture therein an hermetically sealed inspection window mounted in said wall, a transparent disk rotatably mounted eccentrically to the inspection window to cover the same, means for rotating said disk, a stationary screen adjacent the disk, said scren having an aperture in axial alignment with the window, a disk like rotor in the chamber and having means extending thru said wall, said rotor having a single aperture which in one particular position during each revolution of the rotor comes into alignment with the aperture of said screen, and means for rotating said rotor, said rotor being driven at a minimum speed of 1200 r.p.m.

5. In a vacuum chamber, a wall having an aperture therein, an hermetically sealed window in said wall for visual inspection of the interior of the chamber, a rotatable transparent disk in the chamber, adjacent the window to cover same, a fixed stationary screen in said chamber having an aperture axially aligned with said window, a disk adjacent the screen and having an opening therein in alignment with the window and the opening of the screen, and means for rotating said last named disk at a speed at least sufficient to produce a continuous image thru the openings of the screen and disks when in alignment.

References Cited by the Examiner

UNITED STATES PATENTS

| 2,197,637 | 4/1940 | Goldberg | 126—200 |
| 2,440,938 | 5/1948 | Falge | 126—200 |
| 2,908,254 | 10/1959 | Mangold et al. | 126—200 |
| 2,926,659 | 3/1960 | Ligon | 126—200 |

FREDERICK L. MATTESON, JR., *Primary Examiner.*

KENNETH W. SPRAGUE, *Assistant Examiner.*